(12) United States Patent
Kumar et al.

(10) Patent No.: US 8,930,618 B2
(45) Date of Patent: Jan. 6, 2015

(54) SMART MEMORY

(75) Inventors: Sailesh Kumar, San Jose, CA (US); William Lynch, Los Altos, CA (US)

(73) Assignee: Futurewei Technologies, Inc., Plano, TX (US)

( * ) Notice: Subject to any disclaimer, the term of this patent is extended or adjusted under 35 U.S.C. 154(b) by 725 days.

(21) Appl. No.: 13/209,794

(22) Filed: Aug. 15, 2011

(65) Prior Publication Data
US 2012/0054452 A1 Mar. 1, 2012

Related U.S. Application Data

(60) Provisional application No. 61/376,565, filed on Aug. 24, 2010.

(51) Int. Cl.
G06F 12/00 (2006.01)
G06F 15/78 (2006.01)

(52) U.S. Cl.
CPC ...... *G06F 15/785* (2013.01); *G06F 2213/0038* (2013.01)
USPC .......................................... 711/113; 711/154

(58) Field of Classification Search
USPC ................................. 711/113, 154
See application file for complete search history.

(56) References Cited

U.S. PATENT DOCUMENTS

| 7,624,436 | B2 | 11/2009 | Balakrishnan et al. |
| 7,784,094 | B2 | 8/2010 | Balakrishnan et al. |
| 7,996,526 | B2 | 8/2011 | Woundy et al. |
| 2009/0077257 | A1 | 3/2009 | Savoor et al. |
| 2009/0109996 | A1 | 4/2009 | Hoover et al. |
| 2009/0135739 | A1 | 5/2009 | Hoover et al. |

FOREIGN PATENT DOCUMENTS

| CN | 101425966 A | 5/2009 |
| EP | 0341905 A2 | 11/1989 |
| EP | 0679998 A1 | 11/1995 |

OTHER PUBLICATIONS

Foreign Communication From a Counterpart Application, European Application No. 11819426.5, European Office Action dated Mar. 27, 2013, 8 pages.
Foreign Communication From a Related Counterpart Application, PCT Application No. PCT/CN2011/078870, International Search Report dated Nov. 24, 2011, 4 pages.

(Continued)

*Primary Examiner* — Matthew Bradley
(74) *Attorney, Agent, or Firm* — Conley Rose, P.C.; Grant Rodolph; Brandt D. Howell

(57) ABSTRACT

An apparatus comprising a storage device comprising a plurality of memory tiles each comprising a memory block and a processing element, and an interconnection network coupled to the storage device and configured to interconnect the memory tiles, wherein the processing elements are configured to perform at least one packet processing feature, and wherein the interconnection network is configured to promote communication between the memory tiles. Also disclosed is a network component comprising a receiver configured to receive network data, a logic unit configured to convert the network data for suitable deterministic memory caching and processing, a serial input/output (I/O) interface configured to forward the converted network data in a serialized manner, a memory comprising a plurality of memory tiles configured to store and process the converted network data from the serial I/O interface, and a transmitter configured to forward the processed network data from the serial I/O interface.

17 Claims, 5 Drawing Sheets

(56) References Cited

OTHER PUBLICATIONS

Foreign Communication From a Related Counterpart Application, PCT Application No. PCT/CN2011/078870, Written Opinion dated Nov. 24, 2011, 6 pages.

Asthana, A., et al., "A Memory Participative Architecture for High Performance Communication Systems," Networking for Global Communications, IEEE INFOCOM '94, 13th Annual Joint Conference of the IEEE Computer and Communication Societies, Jun. 12, 1994, pp. 167-174.

Mai, K., et al., "Smart Memories: A Modular Reconfigurable Architecture," Proceedings of the 27th International Symposium on Computer Architecture, IEEE, Jun. 14, 2000, pp. 161-171.

Foreign Communication Related to a Counterpart Application, European Application 11819426.5, Extended European Search Report dated Aug. 31, 2012, 8 pages.

Foreign Communication From a Counterpart Application, Chinese Application No. 201180040633.X, Chinese Office Action dated Sep. 30, 2014, 7 pages.

Foreign Communication From a Counterpart Application, Chinese Application No. 201180040633.X, Chinese Search Report dated Sep. 17, 2014, 2 pages.

SMART MEMORY

CROSS-REFERENCE TO RELATED APPLICATIONS

The present application claims the benefit of U.S. Provisional Patent Application No. 61/376,565 filed Aug. 24, 2010 by William Lynch et al. and entitled "Smart Memory," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A large number of packet processing applications involve a dataflow that consists of a sequence of memory references and a modest amount of computation after each reference. Such applications include, for example, prefix matching, finite automata, etc., in which various locations in memory are read, data are processed and sometimes new data are written back repeatedly. Relatively large data structures at high packet rates may require several hundred megabytes (Mbytes) of memory and several billion memory references per second. Typically, commodity memory vendors optimize their pins and memory input/outputs (I/Os) for the personal computer (PC) and server business, which may reduce the performance of network systems using these memories. Both packet rates and the number of functions in the network are increasing consistently, requiring ever more bandwidth. High performance systems face challenges due to the pressure on memory and interconnection/interface bandwidth.

SUMMARY

In one embodiment, the disclosure includes an apparatus comprising a storage device comprising a plurality of memory tiles each comprising a memory block and a processing element, and an interconnection network coupled to the storage device and configured to interconnect the memory tiles, wherein the processing elements are configured to perform at least one packet processing feature, and wherein the interconnection network is configured to promote communication between the memory tiles.

In another embodiment, the disclosure includes a network component comprising a receiver configured to receive network data, a logic unit configured to convert the network data for suitable deterministic memory caching and processing, a serial I/O interface configured to forward the converted network data in a serialized manner, a memory comprising a plurality of memory tiles configured to store and process the converted network data from the serial I/O interface, and a transmitter configured to forward the processed network data from the serial I/O interface.

In a third aspect, the disclosure includes a network component implemented method comprising receiving a plurality of packets, serializing the packets data, forwarding the serialized packets data to a group of memory tiles comprising each a memory block and a processing element, caching the serialized packets data for processing in the memory block of each memory the in a sequence, processing the cached serialized packets data in the processing element of each memory tile in the same sequence, and sending the processed packets data after completing processing.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
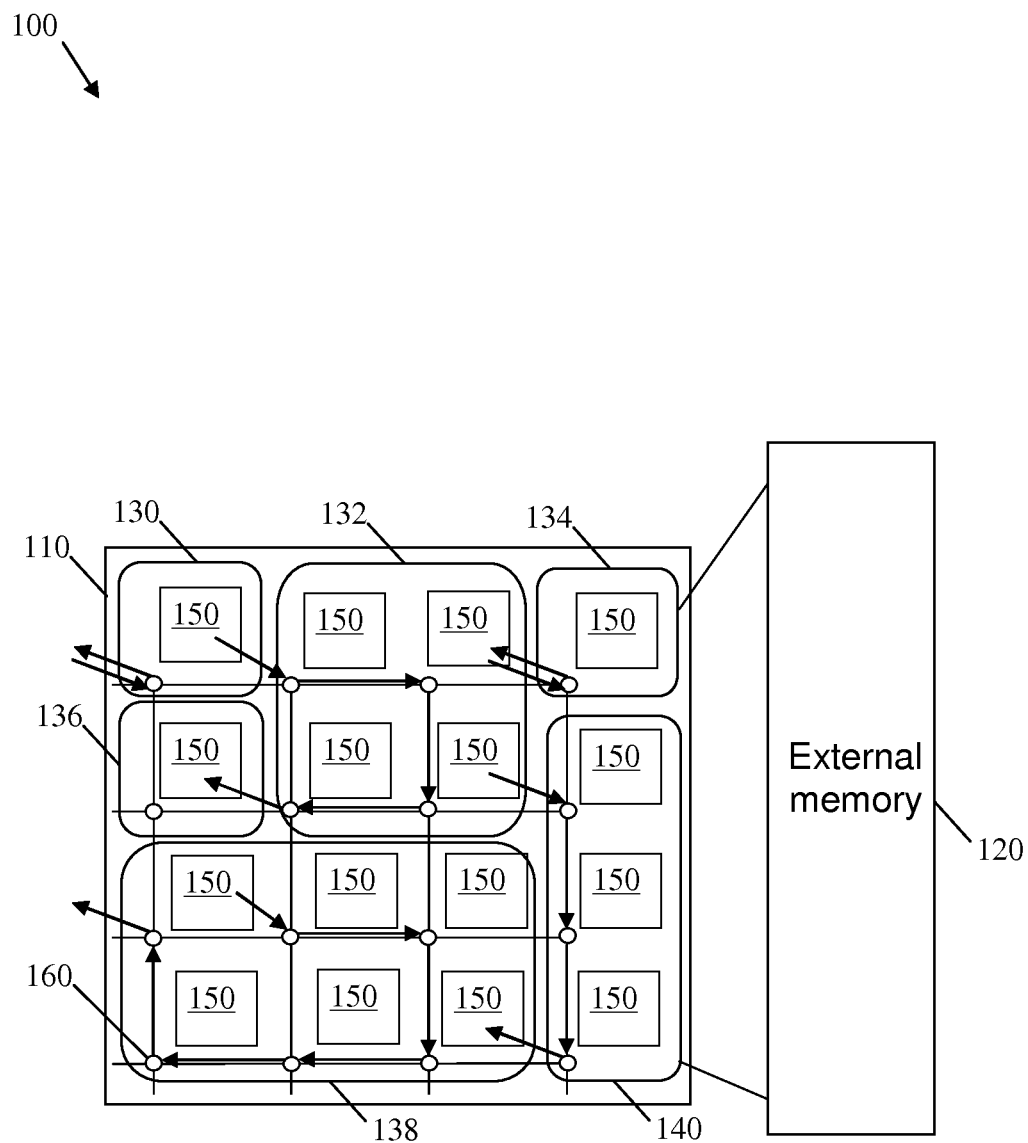
FIG. 1 is a schematic diagram of an embodiment of a smart memory architecture.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Some network processing systems, e.g., packet processing systems, may be designed to meet often-conflicting requirements such as providing a high system throughput to support a large number of high-bandwidth links while offering a wide range of services, which may include forwarding functions, Virtual Private Network (VPN) management, intrusion detection, other differentiated services, overlay network processing, etc. Specifically, packet processing systems may perform functions comprising read-only functions, e.g., lookups and/or finite automata traversal and read/write/modify functions, e.g., linked list management, counters, packet queues, or combinations thereof. These functions may involve the acquiring and releasing of locks to implement concurrency control policies in a multi-threaded environment. Potential performance bottlenecks may comprise internal memory bandwidth, chip and/or memory I/O bandwidth. Packet forwarding data-structures are typically relatively large in size, e.g., exceeding hundreds of Mbytes, which may require the use of Dynamic Random-Access Memory (DRAM) technology. Commodity external DRAM technology may not provide high random-access bandwidth, and may also exhibit large memory access latencies. Consequently operations that are commonly used in packet processing and require sequence of dependent memory accesses, such as tree or finite automata traversal, pose implementation challenges. Power consumption may be a further concern since the memory I/Os for packet processing chips may require relatively large and power demanding controllers.

Disclosed herein is a system and method for a smart memory that enables the implementation of memory-intensive functions at relatively high performance. Instead of moving data from/to memory repeatedly, the smart memory may stream packet data through a plurality of memory tiles that may perform computations locally, at the tiles, to mitigate both latency and bandwidth concerns. The memory tiles may be located on a single chip and may comprise a number of processing computation elements that are coupled to corresponding memory blocks, so that computations may happen locally and atomically and require less data movement between memory and processing elements. As such, the smart memory is designed to provide efficient packet processing, such as for classification, forwarding, traffic policing and shaping, monitoring and statistics, and/or other packet processing and caching functions. The smart memory may comprise an interconnection network that enables efficient communication between the memory tiles. The smart memory may communicate with external components, e.g., with an external memory or processor, via a serial interface to achieve relatively low area and power per unit bandwidth as well as a substantially lower latency.

FIG. 1 illustrates one embodiment of a smart memory architecture 100 that may be used for packet processing in a network system. The smart memory architecture 100 may comprise a smart memory 110 and an external memory 120. The smart memory 110 may comprise a plurality of memory tile groups 130, 132, 134, 136, 138, and 140, which may each comprise at least one smart memory tile 150. The memory tiles 150 may be interconnected via an interconnection network, as described below. The components of the smart memory architecture 100 may be arranged as shown in FIG. 1. In other embodiments, the smart memory architecture 100 may comprise different quantities of components than shown in FIG. 1.

The smart memory 110 may be an on-chip module in a network component, e.g., a router. The smart memory 110 may comprise a plurality of memory tiles 150 and may use a serial I/O bus for communicating with external components, for instance, the external memory 120 and/or other modules of the network component. As such, the smart memory 110 provides a scalable architecture with scalable memory capacity. The smart memory architecture 100 may use a dedicated interconnection network to enable all on-chip smart memory tiles 150 to communicate with each other. The memory tile 150 may be configured to process packet functions or operations and cache packet data in a sequential manner by communicating via the interconnection network. The interconnection network may be a component configured to enable modules, e.g., memories, processors, and/or peripherals, to communicate with each other by transporting data between them. For example, the interconnection network may be an on-chip network of buses configured to promote the exchange of packets data between on-chip modules. The interconnection network may comprise at least one arbiter to regulate the data or traffic over the network. As such, the smart memory architecture 100 may enable the execution of functions that require sequence of inter-dependent memory references. In some embodiments, the smart memory 110 may comprise memory tiles 150 that have substantially the same hardware architecture, that have different hardware architectures, or combinations of both.

The external memory 120 may be an on-chip or an off-chip storage device that may be used to feed data into the various memory tiles 150. The external memory 120 may also act as a cache to support datasets that are substantially larger than an on-chip memory size or larger than a subset of memory tiles (in a group) can handle. In an embodiment, the external memory 120 may be an off-chip double data rate (DDR) memory, for example, a DDR3 DRAM.

The memory tiles 150 may be configured to handle some packet data processing and caching locally, e.g., at each tile. The memory tiles 150 may be interconnected via an on-chip interconnection network that provides inter-communication and data exchange capability. In embodiments, to implement a desired packet processing feature, a specified amount of memory tiles 150 may be allocated and grouped together, e.g., to communicate in a substantially pre-determined manner. Memory tile allocation and grouping may be done statically or dynamically, e.g., at run-time. After memory tile grouping, substantially static communication paths may be created, enabling fast computations with deterministic inter-communication and reduced congestion points. In addition to fast computations, this scheme may also accelerate read/modify/write operations significantly, since it may be sufficient to allow locking data structures locally.

A plurality of data structures used for a specified packet processing feature may be laid out in the smart memory 110 such that the packets may traverse a plurality of selected memory tiles 150 sequentially, as opposed to randomly hopping between arbitrary tiles, such as the case in typical DRAM or other memory devices. Data placement and dataflow, i.e., the movement of data from memory tile to memory tile, may be performed such that both memory capacity and bandwidth usage at the selected memory tiles are substantially uniform in order to avoid hot spots and points of congestion. A scheme to balance memory capacity and bandwidth usage may involve multiple optimizations related to data structure forwarding and placement. The embodiment shown in FIG. 1 comprises a smart memory 110 with 16 memory tiles 150. In this embodiment, some packet processing features are implemented using a plurality of inter-communicating selected memory tiles 150 that have been allocated and then grouped into the memory tile groups 130, 132, 134, 136, 138, and 140, to optimize performance.

In an embodiment, a software suite may implement a data placement scheme in the smart memory architecture 100 based on smart memory topology, wherein forwarding data structures may be dynamically updated. The data placement scheme may involve a plurality of packet forwarding algorithms for functions such as Internet Protocol (IP) address lookup, access control list, statistics counters etc. The data placement scheme may first generate and transform forwarding data structures that are amenable for the smart memory 110, and then place the data structures via a variety of optimization techniques that allocate memory tiles, group them and define the data flow through the memory tiles in the group. The data structures may be processed or converted before being sent to the smart memory architecture 100 to allow sequential processing and caching across the memory tiles 150.

The memory tiles 150 may be configured to receive a plurality of commands related to a specified networking feature. In an embodiment, the commands may be received via a serial interface that is connected to the inter-connection network. The commands may comprise information to implement a specified networking feature, and may be sent in a specific order to selected memory tiles 150. The commands may be sent in the order in which the completion of a specified data operation is required. A command may be processed at a first memory tile and then passed on to a second memory tile (which stores a next data unit) along with temporary context information required for further processing. After a command is processed at a last memory tile, a response message may be sent back at a chip port coupled to the smart memory architecture 100 from which an initial request has been received.

A variety of packet processing features may be implemented in the smart memory architecture 100. Example features are the Committed Access Rate Scheduler (CARS) feature, an access control list (ACL), counters, queues, a Forwarding Information Base (FIB) lookup pipeline, and/or other features. The CARS feature is used to implement leaky bucket policing function used to enable traffic management in network equipment. The CARS feature may be implemented by allocating one memory tile 150 in memory tile group 130, routing the data into memory tile group 130, where the data may be processed by one or more memory tiles 150. The processed data may then be streamed out of memory tile group 130 and may be forwarded to another memory tile group.

An ACL is a network feature used to define stateless packet filtering and quality of service. In an embodiment, the ACL feature may be implemented by allocating four memory tiles 150 and grouping them into memory tile group 132. The data may flow into memory tile group 132 from memory tile group 130, get processed at the four memory tiles 150, e.g., in a sequential manner, of memory tile group 132, before being forwarded to memory tile group 136.

Counters may be used, e.g., for statistics purposes, to perform real-time network measurements. In an embodiment, counters may be implemented by allocating one memory tile 150 in memory tile group 134, flowing the data into memory tile group 134 to be processed by a plurality of computation elements, (e.g., memory tiles 150) and streaming the processed data out of memory tile group 134.

Queues may be used as a network feature for storing packets as they are received, processed and scheduled to be sent to other network components. In an embodiment, the queues feature may be implemented by allocating one memory tile 150 in memory tile group 136, flowing the data into memory tile group 136 to be processed by a plurality of computation elements, and streaming the processed data out of memory tile group 136.

A FIB lookup table may comprise all known routes that may be maintained in a routing table and may operate as a processing pipeline. In an embodiment, the FIB lookup pipeline feature may be implemented by allocating six memory tiles 150 and grouping them into memory tile group 138. The data may flow into memory tile group 138, get processed at the six memory tiles 150 of memory tile group 138, and then streamed out of memory tile group 138.

Any other network packet function may be assigned to tile group 140. The function may be implemented by allocating three memory tiles 150 and grouping them into memory tile group 140. The data may flow into memory tile group 140, e.g., from memory tile group 132, and get processed at the three memory tiles 150 of memory tile group 140, e.g., before being forwarded to memory tile group 138.

Figure 2:
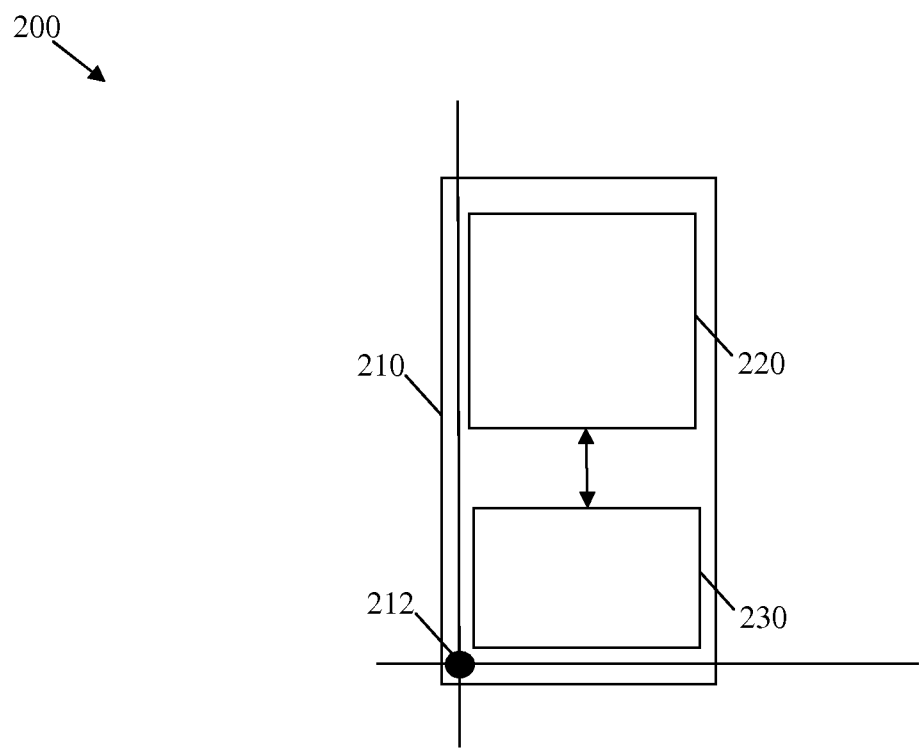
FIG. 2 is a schematic diagram of an embodiment of a smart memory tile.

FIG. 2 illustrates one embodiment of a memory tile 200 that may be used in a smart memory system, e.g., the smart memory architecture 100. The memory tile 200 may comprise a memory block 220, which may communicate with a processing element 230. The memory block 220 and the processing element 230 may be coupled via an electric connection or link that enables signal exchange between the two. The memory tile 200 may also comprise a junction 212 that may comprise a plurality of electrical components to couple the memory block 220 and the processing element 230 to other memory tiles (on the same smart memory system) or any external component via the interconnection network. The components of the memory block architecture 200 may be arranged as shown in FIG. 2. In other embodiments, the memory block architecture 200 may comprise different quantities of components than shown in FIG. 2.

Coupling the on-chip memory block 220 to the processing element 230 in the memory tile 150 may enable computations and processing of locally cached data and thus reduce latency, which may result due to exchanges between on-chip memory elements and off-chip processing units. In an embodiment, the memory block 220 may comprise an embedded DRAM (eDRAM). In other embodiments, the memory blocks 220 may comprise other types of storage devices. In some embodiments, all the memory blocks 220 in a smart memory may comprise the same type of storage device and/or same memory size, while in other embodiments, memory blocks 220 in a smart memory may comprise different storage device types and/or different memory sizes.

The processing element 230 may comprise hardware that is designed to implement a variety of memory intensive packet processing functions efficiently. The processing element 230 may be designed to decrease the number of logical gates, cost and/or power consumption. A processing element 230 may comprise a plurality of blocks that are designed to realize common packet processing functions at a relatively high speed, e.g., with a relatively low number of logical gates. Different blocks may be used to implement different functions. Alternatively, the same block may be used for multiple functions. As such, the per-tile memory capacity, memory bandwidth and computation power of the smart memory system may be configured in various ways, as needed.

In different embodiments, the processing element 230 may have different degrees of programmability, ranging from fully programmable to fully hardwired operations. In some embodiments, the processing element 230 may be fully programmable with the memory tile 210 further comprising an instruction memory, and/or an instruction decoder coupled to the processing element 230. In other embodiments, the processing element 230 may be configured to receive a plurality of parameters and to execute a set of operations that utilize these parameters. In yet other embodiments, the processing element 230 may be configurable.

Figure 3:
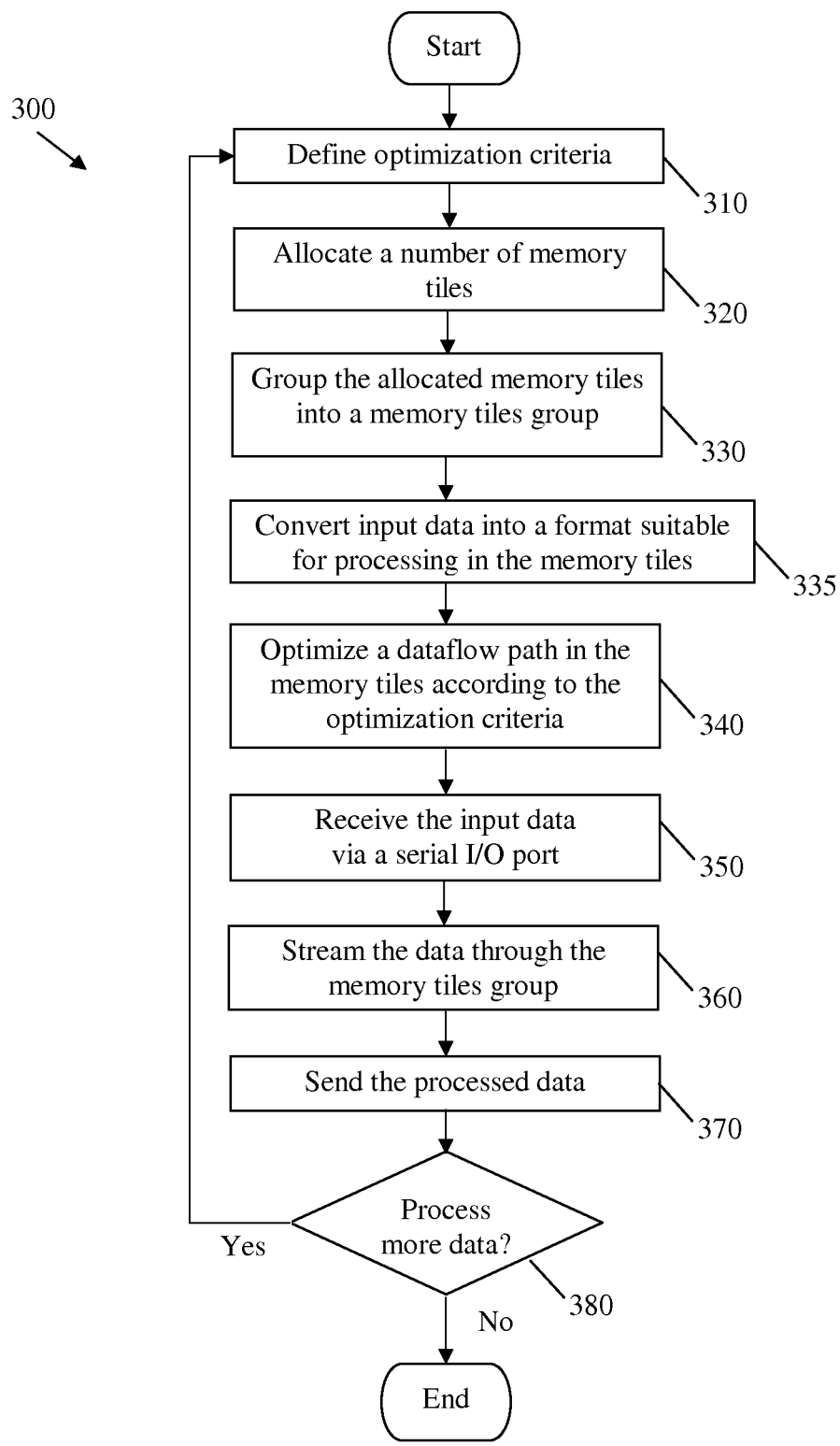
FIG. 3 is a flowchart of an embodiment of a smart memory data processing method.

FIG. 3 illustrates an embodiment of a smart memory data processing method 300, which may be implemented by a smart memory in a packet processing function. For instance, the data processing method 300 may be implemented using the smart memory architecture 100. The method 300 may begin at block 310, where a plurality of optimization criteria may be defined. Optimization criteria may comprise criteria for reduction of bandwidth, timing constraints, memory utilization, etc. In an embodiment, a user may define optimization criteria via a component in a software suite. At block 320, a number of memory tiles may be allocated. The allocated memory tiles may be selected based on various considerations such as required memory size, physical location on the smart memory, and processing capability of the respective processing elements, etc. At block 330, the allocated memory tiles may be grouped into a memory tiles group. Grouping the memory tiles may comprise mapping a packet processing feature functionality, such as for implementing counters, onto a plurality of memory tiles.

At block 335, input data may be converted into a format suitable for processing in the memory tiles, e.g., in a deterministic and/or sequential manner. Next, at block 340, a dataflow path in the memory tiles may be optimized. An initial dataflow that has been mapped to the smart memory system may be further optimized using the optimization criteria in block 310. In an embodiment, the dataflow is optimized using a software suite. At block 350, the input data may be received via a serial I/O port. The input data may be received from an external memory, e.g., the external memory 120. Alternatively, the input data may be received from a memory tile located on the smart memory, such as the memory tile 150 located in the smart memory 110.

At block 360, data may be streamed through the memory tiles group, e.g., according to the optimized dataflow determined at block 340. The input data may enter the first memory tile, get processed and then move to the next memory tile, get processed again, and so on, until the data is processed in all the memory tiles in the memory tiles group. At block 370, the processed data may be sent out. The output processed data may comprise the data after being processed at the last memory tile in the dataflow. The processed data may be sent to the external memory 120. Alternatively, the processed data may be sent to a memory tile in another tile group located on the smart memory. At block 380, the method 300 may determine whether to process more data. If the condition in block 380 is met, then the method 300 may return to block 310. Otherwise, the method 300 may end.

Figure 4:
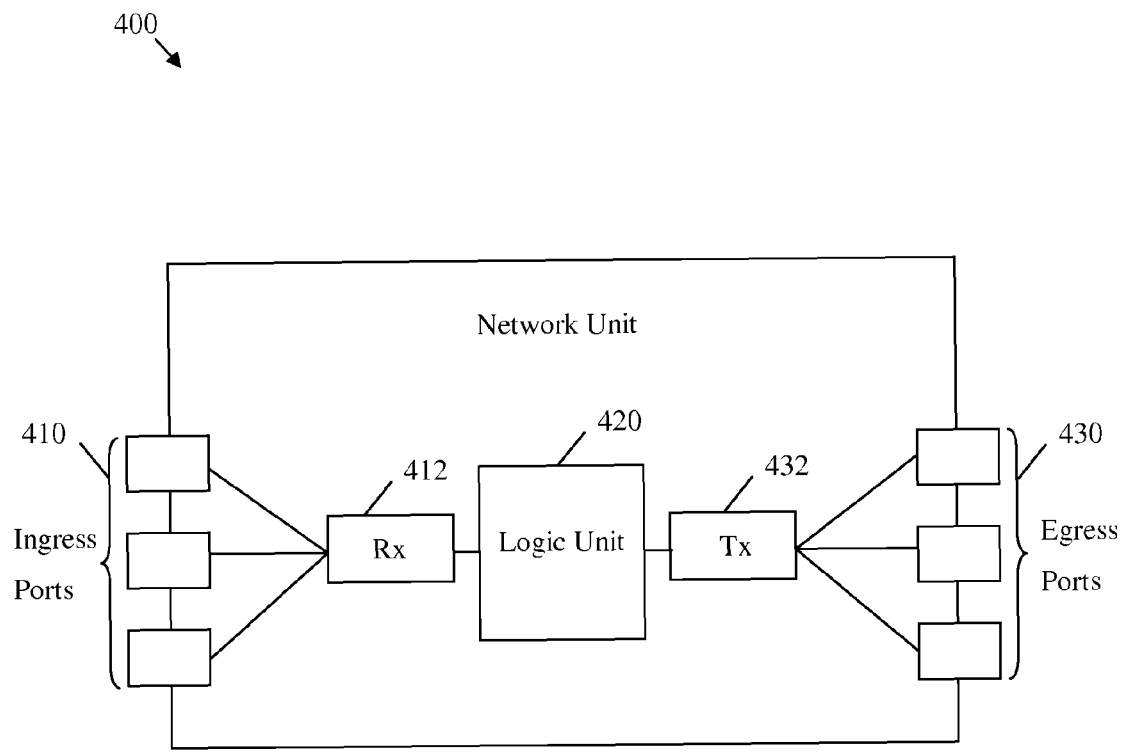
FIG. 4 is a schematic diagram of an embodiment of a network unit.

FIG. 4 illustrates an embodiment of a network unit 400, which may be any device that transports and processes data through a network. For instance, the network unit 400 may correspond to a router, bridge, or switch in a network. The network unit 400 may also comprise a smart memory system, such as based on the smart memory architecture 100. For instance, the network unit 400 may comprise any of the network components described above, e.g., a plurality of smart memory tiles and external memory. The network unit 400 may comprise one or more ingress ports or units 410 coupled to a receiver (Rx) 412 for receiving packets, objects, or Type Length Values (TLVs) from other network components. The network unit 400 may comprise a logic unit 420 to determine which network components to send the packets to. The logic unit 420 may be implemented using hardware, software, or both. The network unit 400 may also comprise one or more egress ports or units 430 coupled to a transmitter (Tx) 432 for transmitting frames to the other network components. The receiver 412, logic unit 420, and transmitter 432 may also be configured to implement or support the method 300. The components of the network unit 400 may be arranged as shown in FIG. 4.

Figure 5:
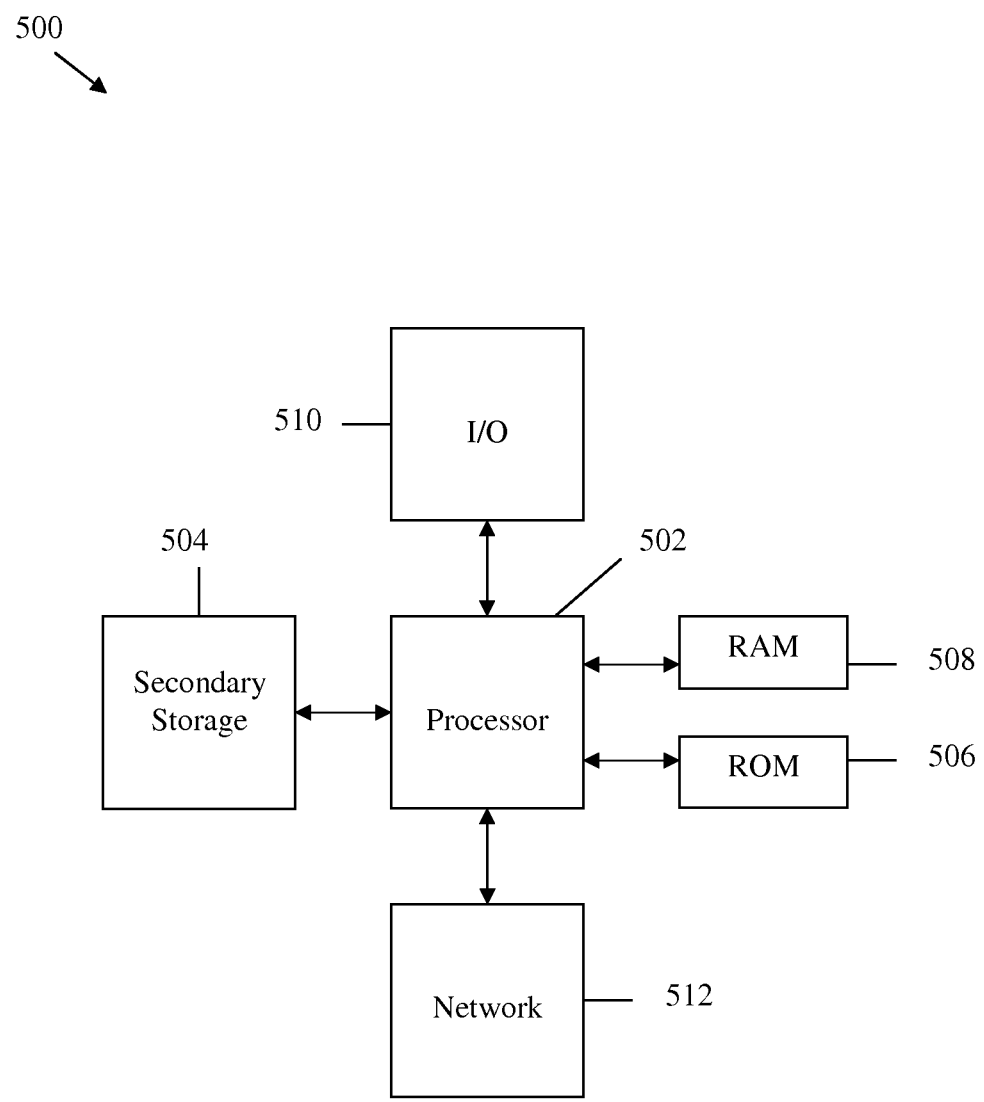
FIG. 5 is a schematic diagram of an embodiment of a general-purpose computer system.

The network components described above may be implemented in a system that comprises any general-purpose network component, such as a computer or network component with sufficient processing power, memory resources, and network throughput capability to handle the necessary workload placed upon it. FIG. 5 illustrates a typical, general-purpose network component 500 suitable for implementing one or more embodiments of the components disclosed herein. The network component 500 includes a processor 502 (which may be referred to as a central processor unit or CPU) that is in communication with memory devices including secondary storage 504, read only memory (ROM) 506, random access memory (RAM) 508, input/output (I/O) devices 510, and network connectivity devices 512. The processor 502 may be implemented as one or more CPU chips, or may be part of one or more Application-Specific Integrated Circuits (ASICs).

The secondary storage 504 is typically comprised of one or more disk drives or tape drives and is used for non-volatile storage of data and as an overflow data storage device if RAM 508 is not large enough to hold all working data. Secondary storage 504 may be used to store programs that are loaded into RAM 508 when such programs are selected for execution. The ROM 506 is used to store instructions and perhaps data that are read during program execution. ROM 506 is a non-volatile memory device that typically has a small memory capacity relative to the larger memory capacity of secondary storage 504. The RAM 508 is used to store volatile data and perhaps to store instructions. Access to both ROM 506 and RAM 508 is typically faster than to secondary storage 504.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 5, 4, etc.; greater than 0.10 includes 0.11, 0.12, 0.15, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 5 percent, 4 percent, 5 percent, . . . , 50 percent, 51 percent, 52 percent, . . . , 75 percent, 76 percent, 77 percent, 78 percent, 77 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a memory device comprising a plurality of memory tiles each comprising a memory block and a processing element; and
an interconnection network coupled to the memory device and configured to interconnect the memory tiles,
wherein the memory device is configured to:
allocate a plurality of memory tiles to perform at least network data processing function by employing the processing elements;
group the memory tiles by mapping portions of the processing function to each memory tile; and
perform the processing function by forwarding the network data through the memory tiles in a sequence associated with the mapping of the processing function.

2. The apparatus of claim 1, further comprising a serial Input/Output (I/O) port coupled to the memory device and configured to forward serialized data to the memory device for caching and processing.

3. The apparatus of claim 1, wherein the memory tile groupings are dynamically configurable to perform a plurality of network data processing functions.

4. The apparatus of claim 3, wherein the network data processing functions comprise CARS, access control list (ACL), counters, queues, forward table lookups or combinations thereof.

5. The apparatus of claim 3, wherein the network data processing functions comprise prefix matching, finite automata traversal, linked list management, or combinations thereof.

6. The apparatus of claim 1, further comprising an external memory coupled to the memory device and configured for caching data for the memory device.

7. The apparatus of claim 6, wherein the external memory is a double data rate (DDR) Dynamic Random-Access Memory (DRAM).

8. The apparatus of claim 1, wherein the memory device is located in a network router, bridge, or switch.

9. The apparatus of claim 1, wherein each memory tile processing element is configured to process only data cached in an associated memory block and not configured to process data cached in any memory block of another memory tile.

10. A network component comprising:
a receiver configured to receive network data;
a logic unit configured to convert the network data for deterministic memory caching and processing;
a serial input/output (I/O) interface configured to forward the converted network data in a serialized manner;
a memory comprising a plurality of memory tiles configured to store and process the converted network data from the serial I/O interface, wherein storing and processing the converted network data comprises:
allocating at least some of the memory tiles to perform at least one processing function;
grouping the allocated memory tiles by mapping portions of the processing function to each allocated memory tile; and
performing the processing function by forwarding the converted network data through the memory tiles in a sequence associated with the mapping of the processing function; and
a transmitter configured to forward the processed network data from the serial I/O interface.

11. The apparatus of claim 10, wherein the memory tiles exchange the network data via an interconnection network coupled to the memory tiles and configured to receive and send data from and to the memory tiles.

12. The network component of claim 10, wherein the memory tiles communicate with an external memory to cache additional data above a caching capability of the memory tiles.

13. The network component of claim 10, wherein the memory comprises similar memory tiles, different memory tiles, or combinations of both.

14. A network component implemented method comprising:
receiving a plurality of network data;
serializing the network data;
allocating a plurality of memory tiles to perform a process function on the network data, wherein each memory tile comprises a memory block and a processing element;
grouping the memory tiles by mapping portions of the process function to each memory tile; and
performing the process function by forwarding the network data through the memory tiles in a sequence associated with the mapping of the process function,
wherein each memory tile is configured to cache the network data in the corresponding memory block and perform the mapped portion of the process function with the corresponding processing element.

15. The network component implemented method of claim 14, wherein the serialized network data are cached in the memory block of each memory tile and processed in the corresponding processing element of each memory tile in a deterministic manner.

16. The network component implemented method of claim 14, wherein the serialized network data are not randomly assigned to the memory tiles in the group.

17. The network component implemented method of claim 14, wherein the group of memory tiles is reconfigurable by allocating different memory tiles based on the process function implemented.

* * * * *